United States Patent
Dexter et al.

(10) Patent No.: US 10,780,808 B2
(45) Date of Patent: Sep. 22, 2020

(54) HEADREST FOR A VEHICLE SEAT

(71) Applicant: Faurecia Automotive Seating, LLC, Auburn Hills, MI (US)

(72) Inventors: Brian R. Dexter, Grand Haven, MI (US); Rod Goodrich, Watervliet, MI (US); Jeffery T. Bonk, Chesterfield, MI (US); Ying (Carolyn) Zhao, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 124 days.

(21) Appl. No.: 15/850,541

(22) Filed: Dec. 21, 2017

(65) Prior Publication Data

US 2018/0178696 A1 Jun. 28, 2018

Related U.S. Application Data

(60) Provisional application No. 62/439,548, filed on Dec. 28, 2016.

(51) Int. Cl.
| | |
|---|---|
| *B60N 2/821* | (2018.01) |
| *B60N 2/809* | (2018.01) |
| *B60N 2/829* | (2018.01) |
| *B60N 2/90* | (2018.01) |
| *B60N 2/885* | (2018.01) |
| *B60N 2/64* | (2006.01) |
| *B60N 2/80* | (2018.01) |

(52) U.S. Cl.
CPC ............ *B60N 2/821* (2018.02); *B60N 2/643* (2013.01); *B60N 2/809* (2018.02); *B60N 2/829* (2018.02); *B60N 2/885* (2018.02); *B60N 2/914* (2018.02); *B60N 2002/899* (2018.02); *B60N 2002/905* (2018.02)

(58) Field of Classification Search
CPC .... B60N 2/821; B60N 2/809; B64D 11/0642; A47C 7/38
USPC .......................................................... 297/61
See application file for complete search history.

(56) References Cited

U.S. PATENT DOCUMENTS

| | | | | |
|---|---|---|---|---|
| 2,905,230 A | * | 9/1959 | Gabriel .................. | B60N 2/809 297/410 |
| 3,279,849 A | * | 10/1966 | Radke .................... | A47C 7/425 297/284.5 |
| 3,578,379 A | * | 5/1971 | Taylor ..................... | A47O 1/03 297/71 |

(Continued)

FOREIGN PATENT DOCUMENTS

| CN | 201019785 Y | 2/2008 |
|---|---|---|
| CN | 201484238 | 5/2010 |

(Continued)

OTHER PUBLICATIONS

First Chinese Office Action for Chinese App. No. 201711444810.6, received on Jan. 2, 2020, 4177 CN ∥ 14 pages.

*Primary Examiner* — David R Dunn
*Assistant Examiner* — Tania Abraham
(74) *Attorney, Agent, or Firm* — Barnes & Thornburg LLP

(57) ABSTRACT

An occupant support includes a seat bottom and a seat back. The seat bottom is coupled to a floor of a vehicle. The seat back is coupled to the seat bottom to move relative to the seat bottom. The seat back includes a back rest and a headrest coupled to the backrest.

15 Claims, 10 Drawing Sheets

(56) References Cited

U.S. PATENT DOCUMENTS

| | | | | | |
|---|---|---|---|---|---|
| 4,362,334 | A * | 12/1982 | Ross | | A47C 7/405 297/230.12 |
| 4,711,492 | A * | 12/1987 | Asbjornsen | | A47C 7/405 297/284.7 |
| 5,112,106 | A * | 5/1992 | Asbjornsen | | A47C 7/46 297/284.7 |
| 5,187,848 | A * | 2/1993 | Yokota | | B60N 2/809 29/91.1 |
| 5,237,713 | A * | 8/1993 | Prager | | A47C 1/143 297/900 |
| 5,567,011 | A * | 10/1996 | Sessini | | B60N 2/0232 297/284.4 |
| 6,464,294 | B1 * | 10/2002 | Kain | | B60N 2/2812 297/250.1 |
| 6,527,339 | B2 * | 3/2003 | Voris | | B60N 2/2881 297/219.12 |
| 6,557,307 | B2 * | 5/2003 | Reddig | | A47C 7/40 297/162 |
| 6,666,517 | B2 * | 12/2003 | Clough | | B60N 2/885 297/410 |
| 7,703,855 | B1 * | 4/2010 | Kalinowski | | B60N 2/809 297/452.6 |
| 7,828,387 | B2 * | 11/2010 | Yoshizawa | | B60N 2/832 297/391 |
| 7,992,939 | B2 * | 8/2011 | Pozzi | | A47C 7/38 297/410 |
| 8,419,134 | B1 * | 4/2013 | Yuan | | A47C 7/38 297/284.7 |
| 8,911,020 | B2 * | 12/2014 | Westerink | | B60N 2/80 297/407 |
| 2004/0007910 | A1 * | 1/2004 | Skelly | | A47C 7/38 297/406 |
| 2007/0257530 | A1 * | 11/2007 | Florez | | A47O 7/38 297/217.4 |
| 2008/0116731 | A1 * | 5/2008 | Schurg | | A47C 7/402 297/410 |
| 2012/0080927 | A1 | 4/2012 | Lohmann | | |
| 2012/0326476 | A1 | 12/2012 | Runk | | |
| 2015/0375651 | A1 * | 12/2015 | Palma | | B60N 2/2851 297/181 |
| 2016/0031351 | A1 * | 2/2016 | Galbreath | | B60N 2/64 297/284.1 |
| 2016/0297336 | A1 | 10/2016 | Suomi | | |
| 2017/0101041 | A1 | 4/2017 | Galbreath | | |

FOREIGN PATENT DOCUMENTS

| | | | |
|---|---|---|---|
| CN | 105313736 A | 2/2016 | |
| CN | 205010045 | 2/2016 | |
| DE | 102008030102 | 12/2009 | |
| EP | 2474440 A2 * | 7/2012 | ........... B60N 2/2812 |
| FR | 2814123 | 3/2002 | |
| FR | 2875753 | 3/2006 | |
| GB | 2037154 | 6/1982 | |
| WO | 2006000266 | 1/2006 | |

* cited by examiner

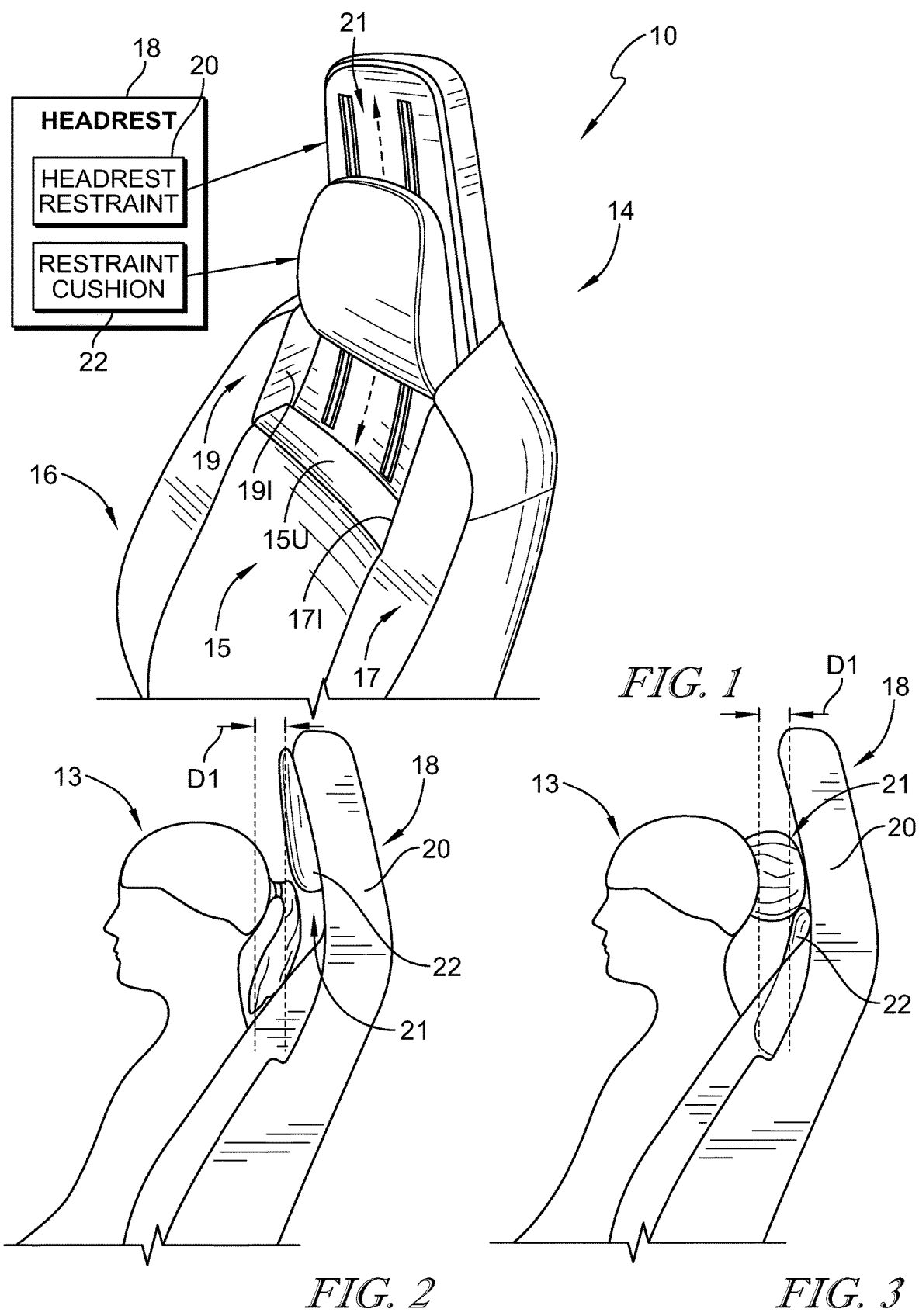

HEADREST FOR A VEHICLE SEAT

PRIORITY CLAIM

This application claims priority under 35 U.S.C. § 119(e) to U.S. Provisional Application Ser. No. 62/439,548, filed Dec. 28, 2016, which is expressly incorporated by reference herein.

BACKGROUND

The present disclosure relates to a vehicle seat, and particularly to a vehicle seat including a seat back. More particularly, the present disclosure relates to a seat back including a backrest and a headrest coupled to the backrest to move relative to the backrest.

SUMMARY

According to the present disclosure, an occupant support includes a seat bottom and a seat back. The seat bottom is arranged to overlie a vehicle floor. The seat back is arranged to extend upwardly away from the seat bottom and includes a backrest and a headrest.

In illustrative embodiments, the headrest is formed integrally with the backrest. The headrest includes a headrest restraint coupled to the backrest and a restraint cushion coupled to the headrest restraint. The restraint cushion is movable relative to the headrest restraint without moving the headrest restraint relative to the backrest.

In illustrative embodiments, the backrest and the headrest cooperate to define a space in the seat back. The space in the seat back may be relocated by moving the restraint cushion to one of a plurality of positions along a predetermined path without moving the headrest restraint. Moving the restraint cushion along the predetermined path adjusts the location of the space on the seat back relative to the restraint cushion.

In illustrative embodiments, an occupant seated on the occupant support may have a hairstyle with a bunching of hair that projects towards the seat back such as, for example, a ponytail or a bun hairstyle. The occupant may move the restraint cushion relative to the seat back without moving the headrest restraint to align the space with the bunching of hair. As such, a desired backset may be maintained for a plurality of hairstyles. The bunching of hair extends into the space to minimize the backset distance between the occupant's head and the headrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of an occupant support showing that the occupant support includes a seat back having a backrest and a headrest coupled to the backrest, the headrest includes a headrest restraint integrally formed with the backrest and a restraint cushion mounted to the seat back in a pair of channels formed in the seat back, and suggesting that the restraint cushion may be moved up-and-down relative to the backrest and the headrest restraint;

FIGS. 2 and 3 are a series of side elevation views of the occupant support of FIG. 1 showing that the restraint cushion is movable relative to the seat back along a predetermined path from a fully raised position as shown in FIG. 2 to a fully lowered position as shown in FIG. 3 to accommodate different hair styles of an occupant;

FIG. 2 is a side elevation view of the occupant supported by the seat back and the restraint cushion in the fully raised position in which the restraint cushion is arranged to lie between the occupant and the headrest restraint and showing that the restraint cushion and the seat back cooperate in the fully raised position to form a hair-receiving space between the restraint cushion and the backrest to receive a ponytail hairstyle of the occupant;

FIG. 3 is a side elevation view of the occupant supported by the seat back and the restraint cushion in the fully lowered position in which the restraint cushion is arranged to lie between the occupant and the backrest and showing that the restraint cushion and the seat back cooperate in the fully lowered position to form a hair-receiving space above the restraint cushion to receive a bun hairstyle of the occupant;

Figure 7:
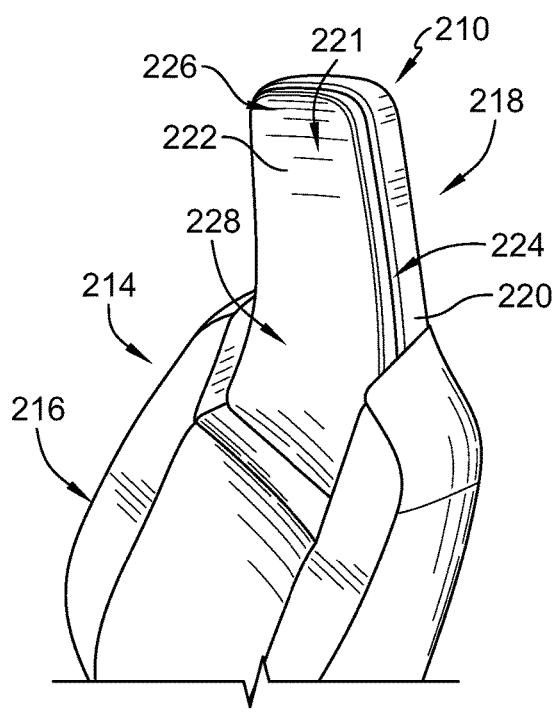
Figure 8:
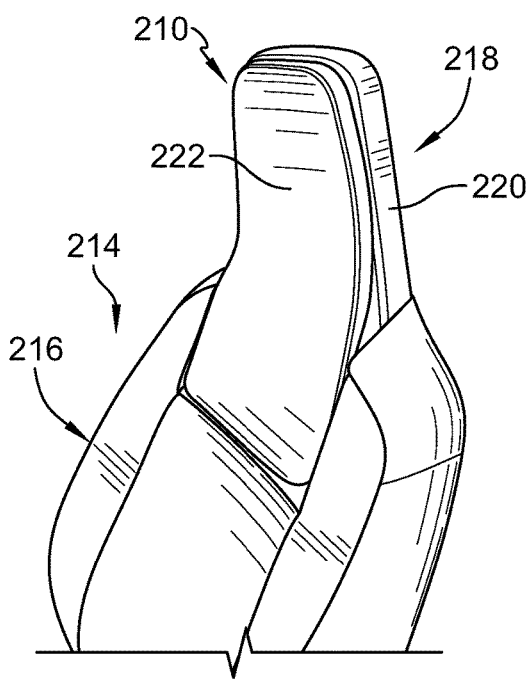
Figure 9:
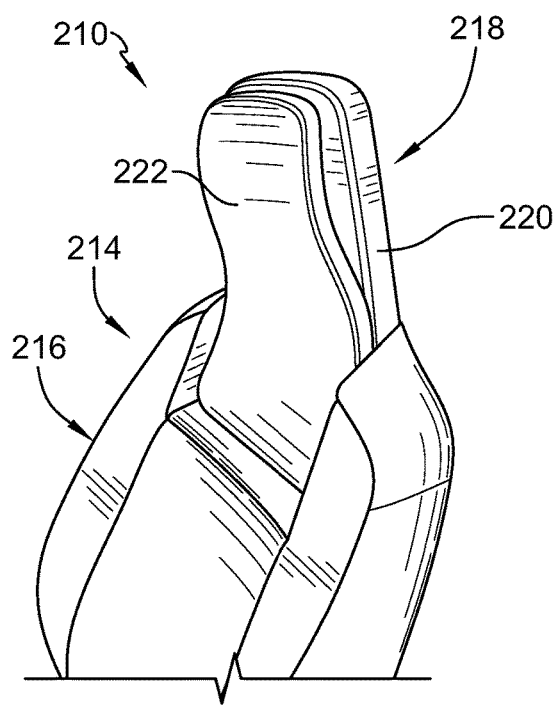
Figure 10:
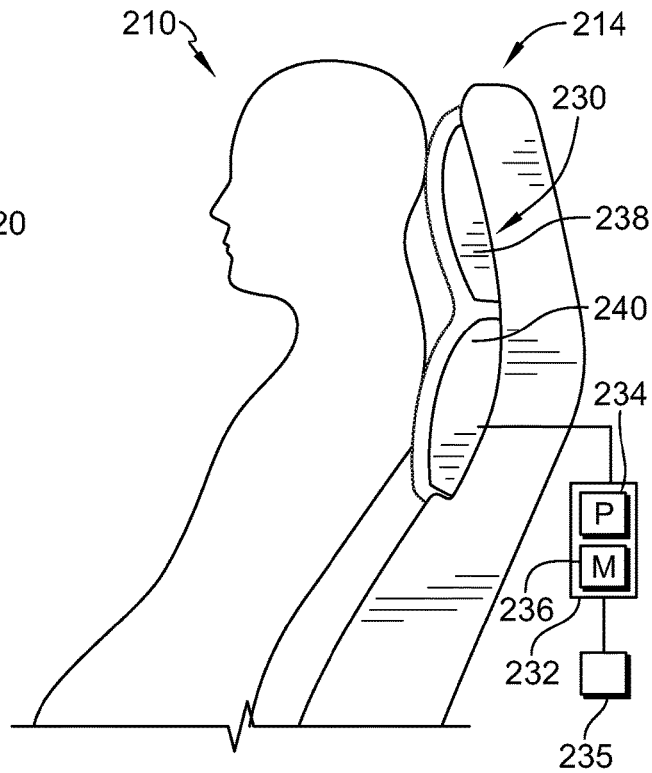
Figure 11:
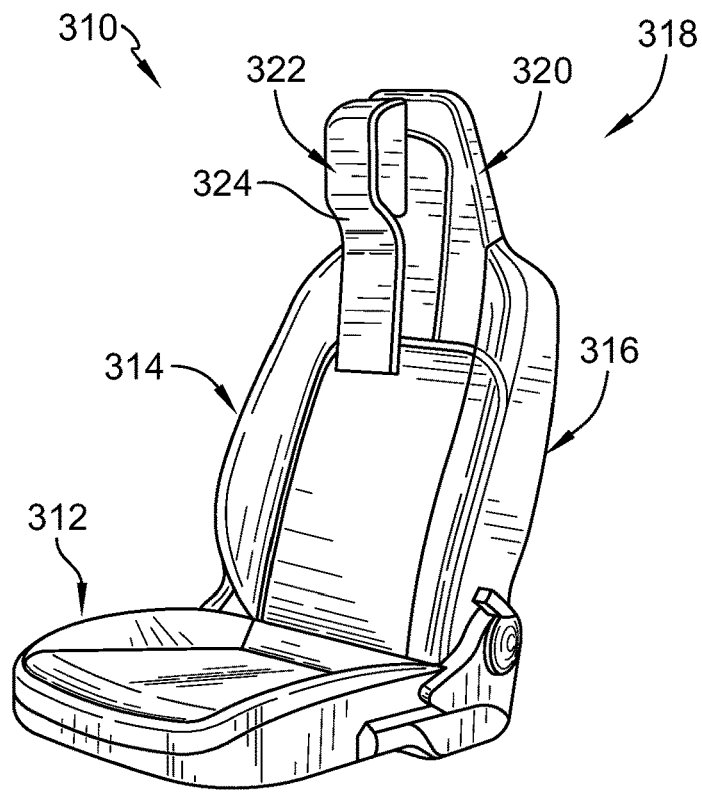
Figure 12:
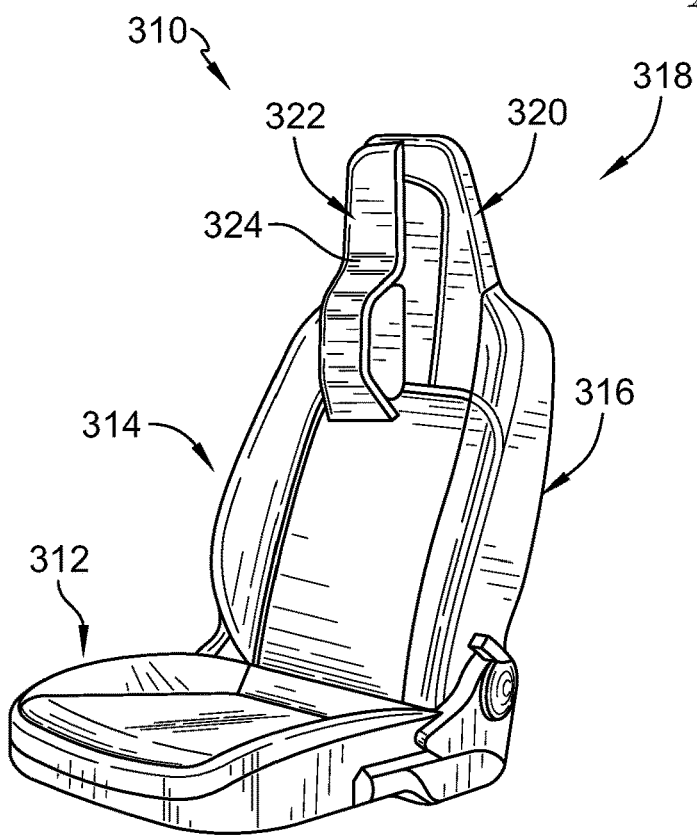
Figure 13:
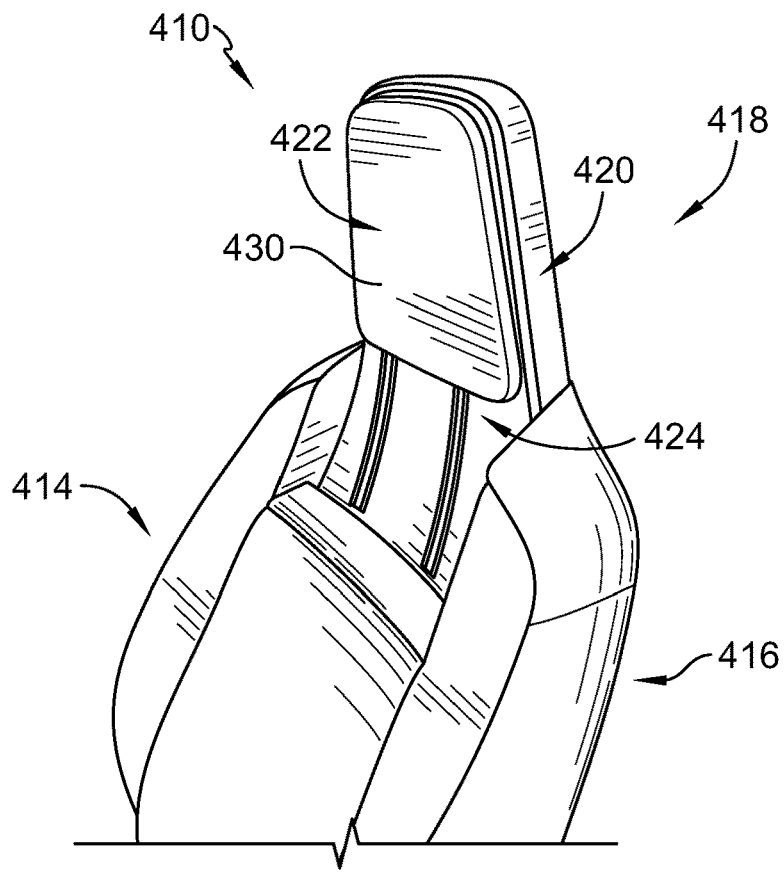
Figure 14:
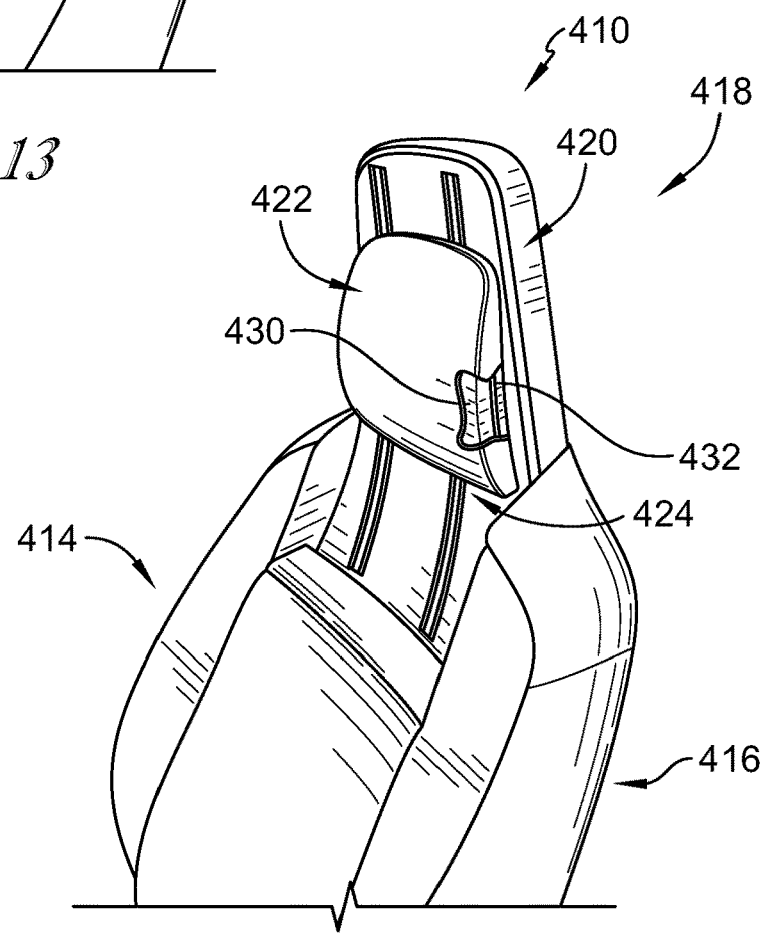
Figure 15A:
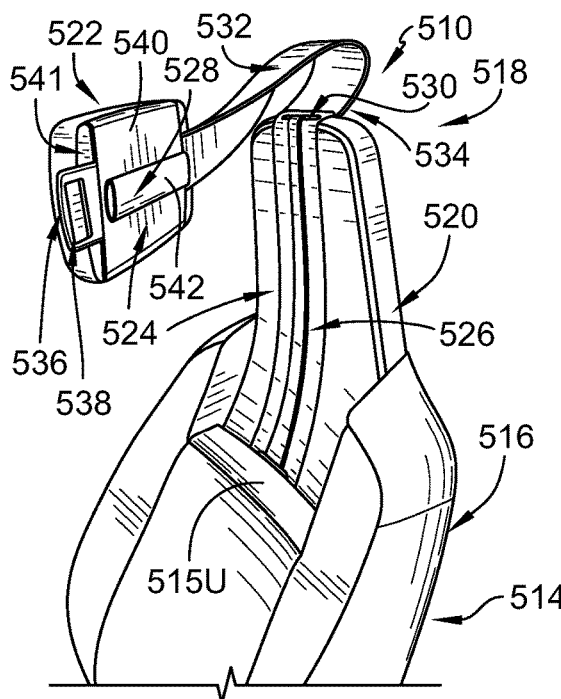
Figure 15B:
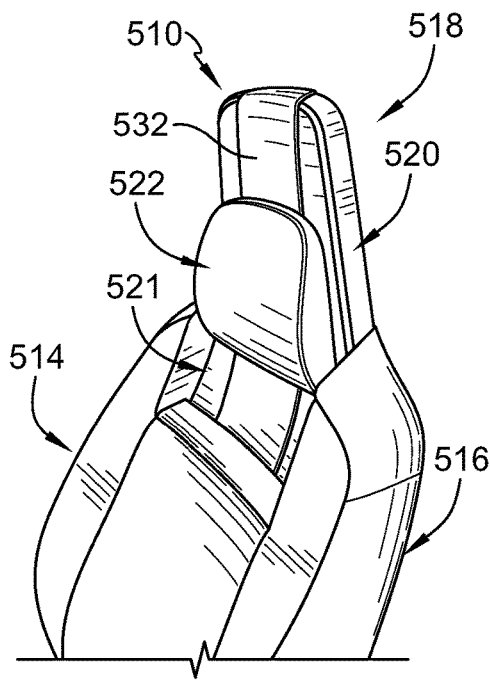
Figure 16:
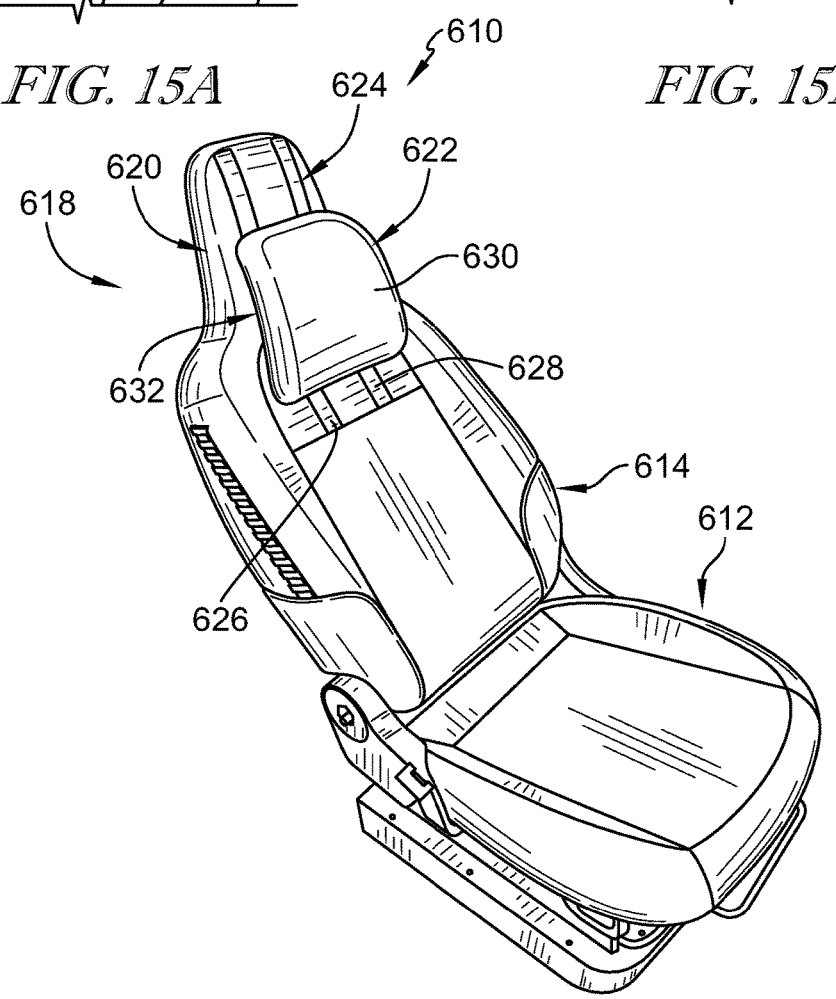
Figure 17:
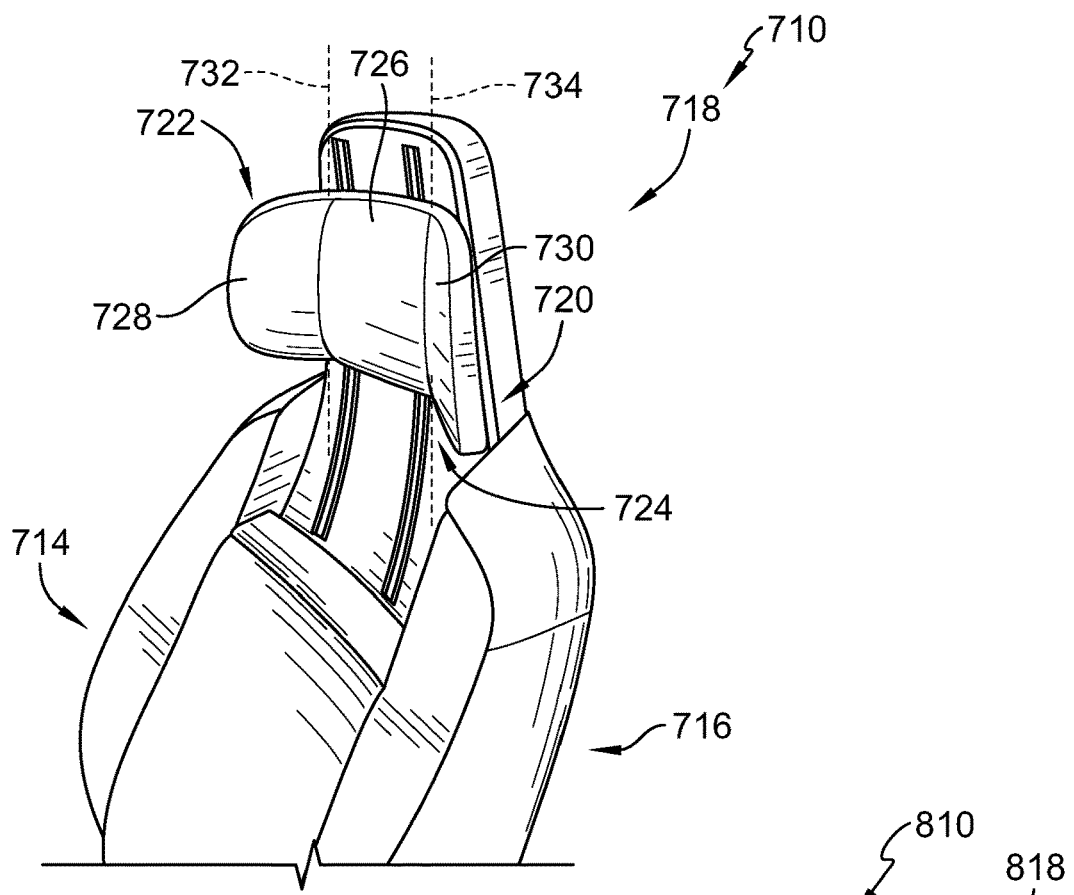
Figure 18:
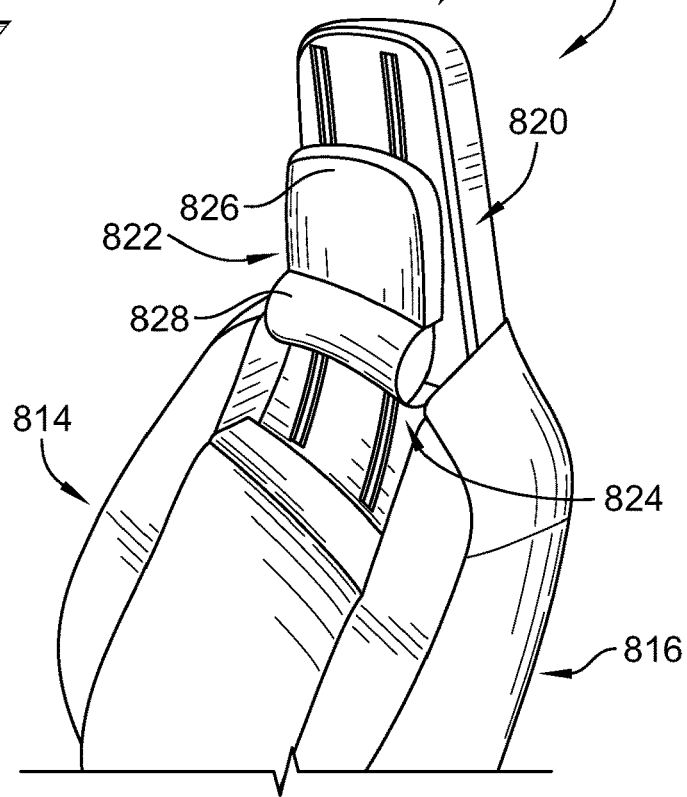
Figure 19:
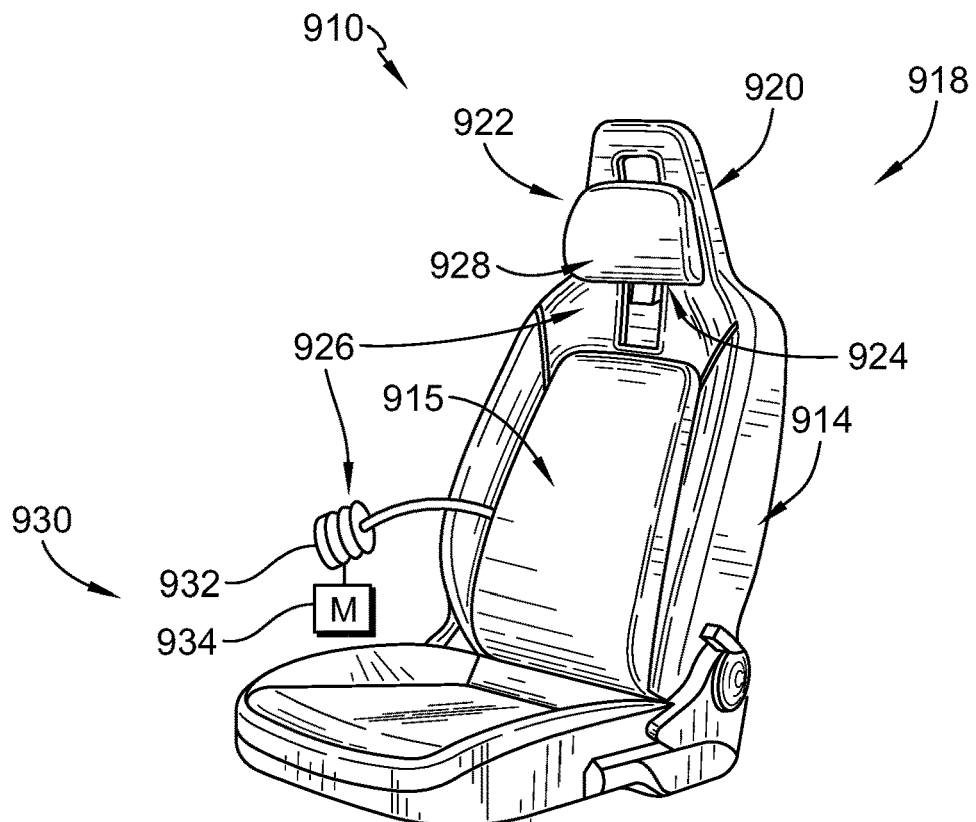
Figure 20:
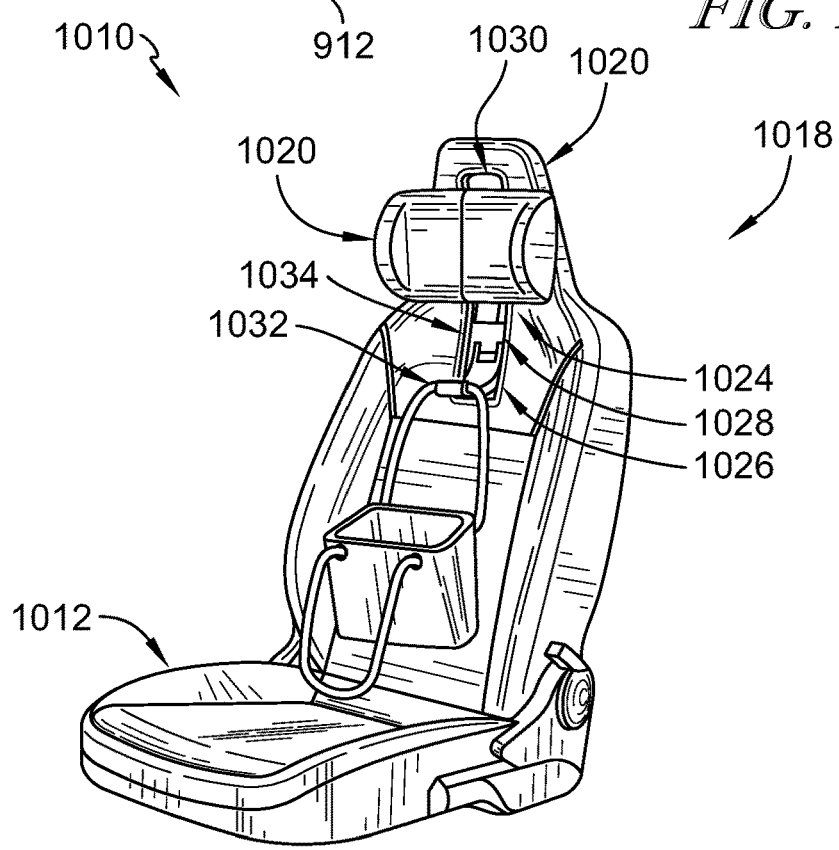

FIGS. 7-9 are a series of perspective views of another embodiment of an occupant support, in accordance with the present disclosure, showing that the occupant support includes a backrest and a headrest that includes a headrest restraint integrally formed with the backrest and a restrain cushion including inflatable bladders coupled to the seat back for movement relative to the seat back between extended positions and retracted positions;

FIG. 7 is a perspective view of an occupant support showing that the restraint cushion includes a headrest portion and a backrest portion, each of the headrest portion and the backrest portions formed by inflatable bladders, and showing that the headrest and backrest portions are arranged in the retracted position to define a depression in the seat back;

FIG. 8 is a perspective view of the seat back of FIG. 7 showing a lower bladder is inflated so that the backrest portion is arranged in the extended position and an upper bladder is at least partially deflated so that the headrest portion is arranged in the retracted position so that the depression is formed only in the headrest portion;

FIG. 9 is a perspective view of the seat back of FIG. 7 showing the lower bladder is at least partially deflated so that backrest portion is arranged in the retracted position and the upper bladder is inflated so that the headrest portion is arranged in the extended position so that the depression is formed only in the backrest portion;

FIG. 10 is a side elevation view of the seat back of FIG. 7 with portions removed to show that the restraint cushion includes at the upper and lower bladders and a cushion cover arranged to cover the bladders;

FIG. 11 is a perspective view of another embodiment of an occupant support with portions broken away to show that the occupant support includes a seat back having a backrest and a headrest that includes a headrest restraint and a restraint cushion, and further showing that a cover is arranged over the restraint cushion and the restraint cushion is in a fully raised position;

FIG. 12 is a perspective view of the headrest of FIG. 11 showing the restraint cushion is arranged to slide relative to the headrest restraint between the headrest restraint and the cover and has assumed in a fully lowered position;

FIG. 13 is a perspective view of the occupant support of FIG. 1 showing the restraint cushion arranged in a generally flat shape, the restraint cushion includes a restraint-cushion pad and a restraint-cushion plate;

FIG. 14 is a perspective view of the occupant support of FIG. 13 showing the restraint cushion arranged in a curved shape in which the restraint-cushion plate forms a generally convex curve to extend the restraint cushion away from the headrest restraint;

FIGS. 15A and 15B are a series of perspective views of another embodiment of an occupant support, the occupant support including a seat back having a backrest and a headrest, the headrest including a headrest restraint and a restraint cushion that is movable relative to the headrest restraint;

FIG. 15A is a perspective view of the occupant support with the restraint cushion separated from the seat back to show that the headrest restraint is formed to include a channel and the restraint cushion includes a tab that is shaped to extend into the channel and the headrest further includes a strap coupled to the restraint cushion and to the headrest restraint to limit movement of the restraint cushion and cover the channel;

FIG. 15B is a perspective view of the occupant support of FIG. 15A assembled so that the tab included in the restraint cushion is received in the channel formed by the headrest restraint to allow up-and-down movement of the restraint cushion relative to the headrest restraint;

FIG. 16 is a perspective view of an another embodiment of an occupant support showing that a restraint cushion included in the occupant support includes a track and a coupler guide and showing that the coupler guide includes a sleeve and the track includes a strap that extends through the sleeve;

FIG. 17 is a perspective view of another embodiment of an occupant support showing that a restraint cushion included in the occupant support includes a left wing, a right wing, and a body coupled between the left wing and the right wing;

FIG. 18 is a perspective view of another embodiment of an occupant support showing that a restraint cushion included in the occupant support includes a pneumatic neck support that is inflatable to provide support for the neck of the occupant;

FIG. 19 is a perspective view of another embodiment of an occupant support showing that a seat back included in the occupant support includes a pneumatic backrest and a pneumatic headrest and suggesting that the pneumatic backrest and headrest may be coupled to one another in fluid communication; and FIG. 20 is a perspective view of another embodiment of an occupant support showing that a headrest included in the occupant support further includes utility hook coupled to the headrest for movement from a storage state to a use state.

DETAILED DESCRIPTION

An occupant support 10, in accordance with the present disclosure, is shown in FIGS. 1-6. A second embodiment of an occupant support 210 is shown in FIGS. 7-10. A third embodiment of an occupant support 310 is shown in FIGS. 11 and 12. A fourth embodiment of an occupant support 410 is shown in FIGS. 13 and 14. A fifth embodiment of an occupant support 510 is shown in FIGS. 15A and 15B. A sixth embodiment of an occupant support 610 is shown in FIG. 16. A seventh embodiment of an occupant support 710 is shown in FIG. 17. An eighth embodiment of an occupant support 810 is shown in FIG. 18. A ninth embodiment of an occupant support 910 is shown in FIG. 19. A tenth embodiment of an occupant support 1010 is shown in FIG. 20.

The occupant support 10, 210, 310, 410, 510, 610, 710, 810, 910, 1010 include a seat bottom 12 and a seat back 14, 214, 314, 414, 514, 614, 714, 814, 914, 1014 as shown in FIGS. 1-20. The seat back 14, 214, 314, 414, 514, 614, 714, 814, 914, 1014 includes a backrest 16 and a headrest 18, 218, 318, 418, 518, 618, 718, 818, 918, 1018 having a headrest restraint 20, 220, 320, 420, 520, 620, 720, 820, 920, 1020 and a restraint cushion 22, 222, 322, 422, 522, 622, 722, 822, 922, 1022. The occupant support 10, 210, 310, 410, 510, 610, 710, 810, 910, 1010 further provides adjustment means for locating the restraint cushion 22, 222, 322, 422, 522, 622, 722, 822, 922, 1022 in one of a plurality of positions relative to the headrest restraint 20, 220, 320, 420, 520, 620, 720, 820, 920, 1020 to cause the restraint cushion 22, 222, 322, 422, 522, 622, 722, 822, 922, 1022 and the headrest restraint 20, 220, 320, 420, 520, 620, 720, 820, 920, 1020 to provide a hair-receiving space between the headrest restraint 20, 220, 320, 420, 520, 620, 720, 820, 920, 1020 and the occupant for receiving a bunching of hair of the occupant without moving the headrest restraint 20, 220, 320, 420, 520, 620, 720, 820, 920, 1020 so that a distance between the headrest 18, 218, 318, 418, 518, 618, 718, 818, 918, 1018 and a head of the occupant is no greater than a predetermined distance.

The occupant support 10 includes the seat back 14 having the backrest 16 and the integrated headrest 18 coupled to the backrest 16 as shown in FIGS. 1-3. The backrest 16 and the headrest 18 cooperate to provide a space 21 (also called a cushion-receiving space 21 and a hair-receiving space 21) in the seat back 14 that may be moved to a plurality of positions to provide a better fit for occupants.

The headrest 18 includes the headrest restraint 20 and the restraint cushion 22 coupled to the headrest restraint 20. The headrest restraint 20 forms a rearward boundary of the space 21. The restraint cushion is coupled to the headrest restraint 20 for up-and-down movement relative to the headrest restraint 20. Moving the restraint cushion 22 upwardly or downwardly relative to the headrest restraint 20 adjusts the location of the space 21 relative to the seat back 14.

According to Federal Motor Vehicle Safety Standards, occupants may be advised to maintain a backset distance between the headrest 18 and the occupant's head of not greater than 25 mm. Occupant's 13 may have varying hairstyles such as, for example, a ponytail or a bun type hairstyle 13A, 13B. When using some headrests, occupant's 13 having varying hairstyles may tilt their head further away from the headrest 18 because of a bunching of hair between the occupant's head and the headrest 18. Alternatively, an occupant having varying hairstyles using a headrest may move the headrest to a location where the headrest is out of the way for their hair, but where the backset distance is less desirable. The present disclosure provides the headrest 18 wherein the occupant 13 may move the restraint cushion 22 relative to the headrest restraint 20 to arrange the space 21 in one of the plurality of position to receive the bunching of hair while maintaining a desirable backset distance D1 between the occupant's head and the headrest 18 as suggested in FIGS. 2 and 3.

The occupant support 10, in accordance with the present disclosure, includes the seat bottom 12 and the seat back 14 as shown in FIG. 1. The seat bottom 12 is arranged to overlie a floor of a vehicle. The seat back 14 is coupled to the seat bottom 12 and is arranged to extend upwardly away from the seat bottom 12 and the floor. The seat back 14 includes the backrest 16 and the integrated headrest 18 coupled to the backrest 16. An upper end 19 of the backrest 16 is formed to include a cushion-receiving space 21. The cushion-receiving space 21 extends into the backrest 16 and opens toward the headrest 18.

The backrest includes a backrest cushion 15, a left bolster 17, and a right bolster 19 as shown in FIG. 1. The backrest cushion 15 and the left and right bolsters 17, 19 cooperate to define at least a portion of the space 21. The backrest cushion 15 has an upper edge 15U that defines a lower boundary of the space 21. The left and right bolsters 17, 19 have respective inner edges 171, 191 that form the right and left boundaries of the space 21.

The headrest 18 includes the headrest restraint 20 and the movable restraint cushion 22 as shown in FIGS. 1-4. The headrest restraint 20 is integrally formed with the backrest 16. The restraint cushion 22 is coupled to the headrest restraint 20 for movement relative to the headrest restraint 20 along a predetermined path to maintain a head of the occupant within a predetermined distance from the headrest 18. In one embodiment, the predetermined path is curvilinear.

The restraint cushion 22 is movable along the predetermined path from a fully raised position as shown in FIG. 2 to a fully lowered position as shown in FIG. 3. The restraint cushion 22 is arranged to lie between the headrest restraint 20 and the occupant when the restraint cushion 22 is in the fully raised position as shown in FIG. 2. The restraint cushion is arranged to lie between the backrest 16 and the occupant when the restraint cushion 22 is in the fully lowered position as shown in FIG. 3. The restraint cushion 22 is received within the cushion-receiving space 21 formed in the backrest 16 when the restraint cushion 22 is in the fully lowered position.

The occupant support 10 further includes adjustment means for locating the restraint cushion 22 in one of a plurality of positions defined along the predetermined path without moving the headrest restraint 20 as suggested in FIGS. 2 and 3. The headrest restraint 20 and the restraint cushion 22 cooperate to provide a hair-receiving space between the headrest restraint 20 and the occupant. The hair-receiving space receives a bunching of hair so that a distance between the headrest 18 and the head of the occupant is no greater than a predetermined distance D1.

A first embodiment of the headrest 18, in accordance with the present disclosure, is shown in FIGS. 1-6. The headrest includes the headrest restraint 20, the restraint cushion 22, and a mount system 24 for coupling the restraint cushion 22 to the seat back 14. The mount system 24 provides the adjustment means for the headrest 18 and includes a track 26 and a coupler guide 28. The track 26 is coupled to the seat back 14 and is shaped to define the predetermined path. The coupler guide 28 is coupled to the restraint cushion 22 and the track 26. In one example, the coupler guide 28 cooperates with the track 26 to block movement of the restraint cushion 22 away from the predetermined path.

Figure 4:
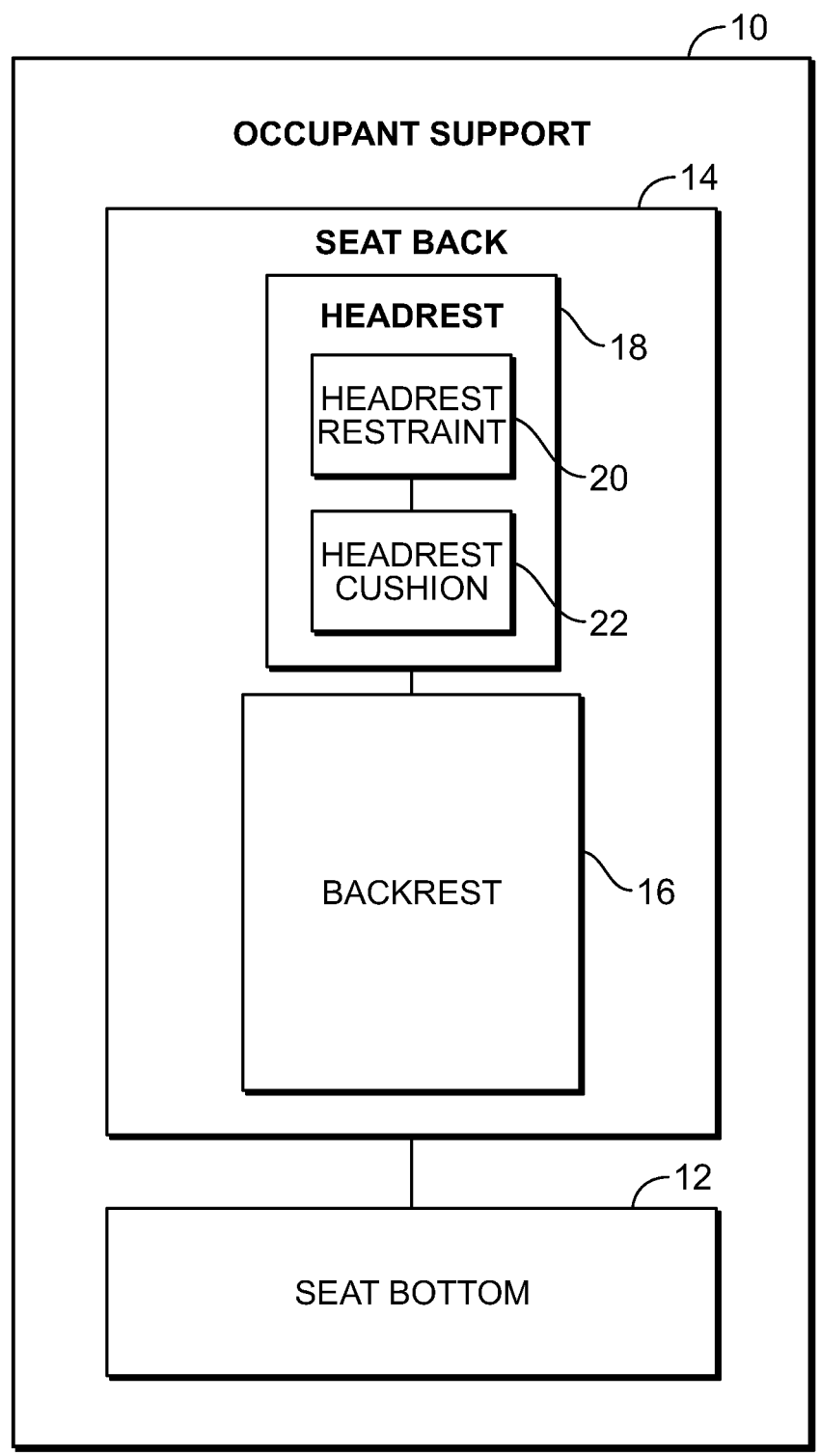
FIG. 4 is a diagrammatic view of the occupant support of FIGS. 1-3 showing that the occupant support includes the seat bottom and the seat back, the seat back including the backrest and the headrest, and the headrest includes the headrest restraint and the restraint cushion.
Figure 5:
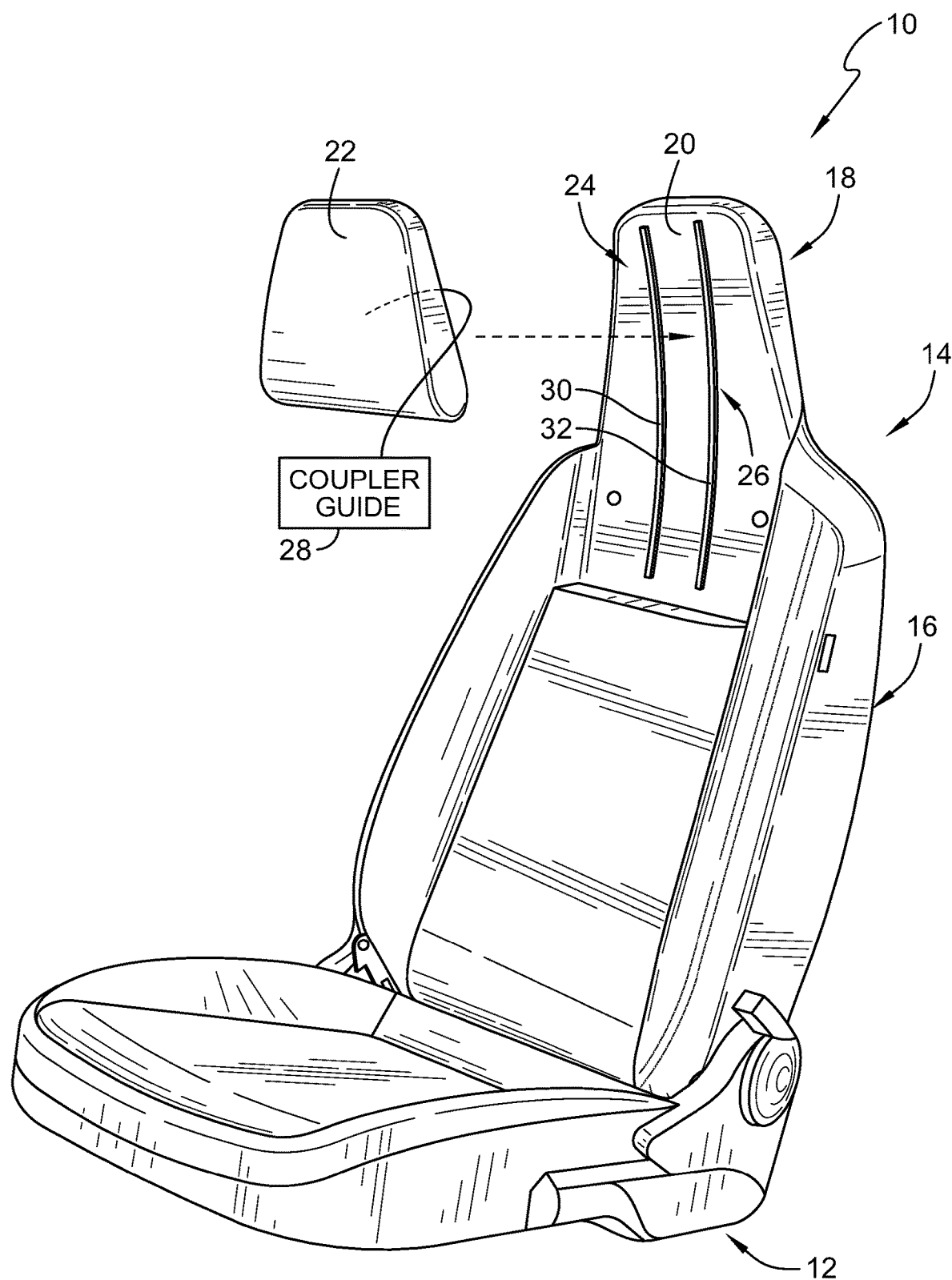
FIG. 5 is an exploded view of the occupant support of FIGS. 1-4 showing that the occupant support includes, from top to bottom, the headrest including the headrest restraint and the restraint cushion, the backrest, and a seat bottom and suggesting that the restraint cushion is coupled to channels included in the headrest restraint for movement relative to the headrest restraint.

The track 26 is formed to include a first channel 30 and a second channel 32 in the headrest restraint 20 as shown in FIG. 5. The first channel 30 is spaced apart from the second channel 32 on an opposite side of the headrest 18. The first and second channels 30, 32 extend from an upper portion of the headrest 18 downwardly to the upper end 19 of the backrest 16.

The coupler guide 28 extends into the channels 30, 32 to couple the restraint cushion 22 to the seat back 14 as shown in FIG. 5. The coupler guide 28 allows a user to move the restraint cushion 22 with sufficient force and blocks movement of the restraint cushion 22 after the location of the restraint cushion 22 is chosen and the force is removed.

Channel fasteners may be used to close the channels 30, 32 as the restraint cushion 22 moves upwardly and downwardly along the track 26. The fasteners may be embodied as soft zippers, flexible slide-extrusions, or any other suitable methods of closing the channels 30, 32. The restraint cushion 22 may be coupled to the track 26 by tabs that extend through the channels 30, 32 and block movement of the restraint cushion 22 away from the predetermined path.

Figure 6:
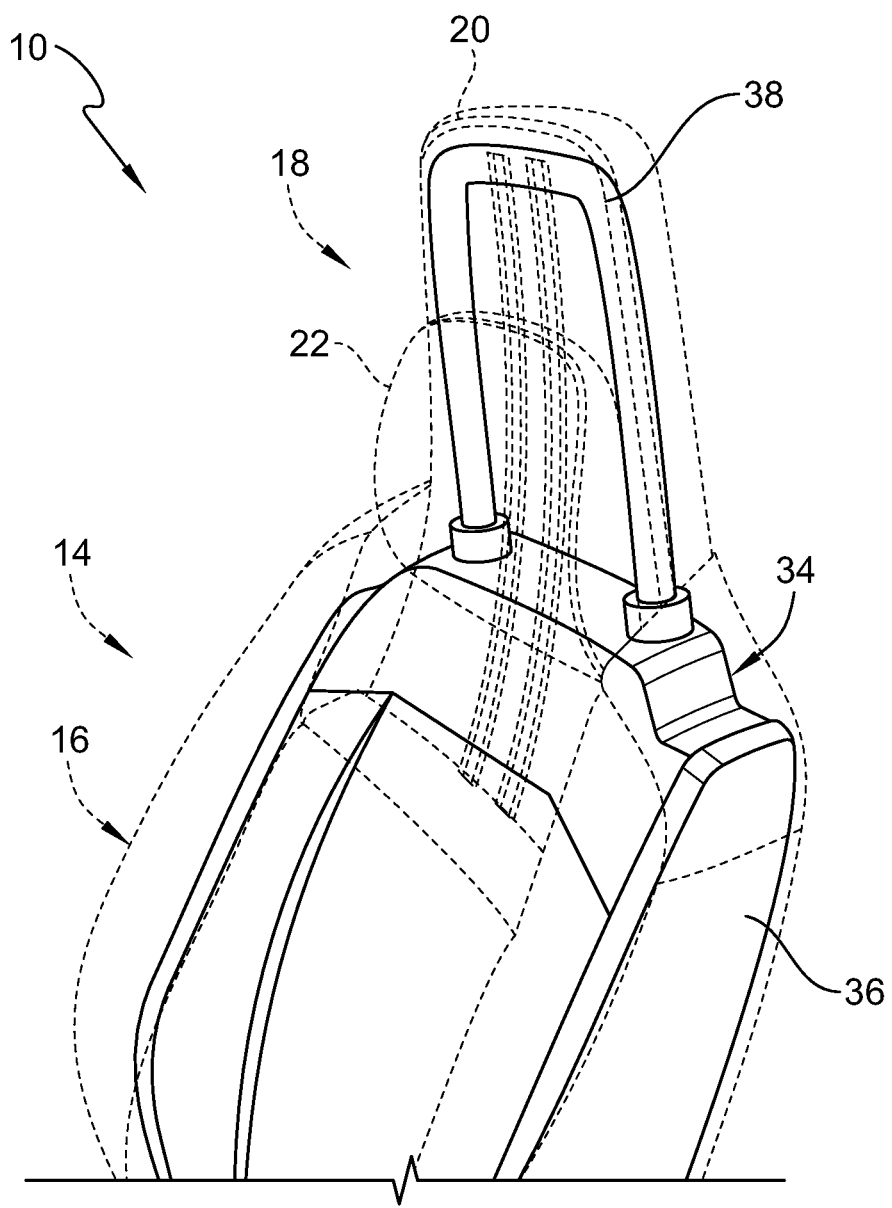
FIG. 6 is a perspective view of the occupant support of FIG. 1 with portions hidden to show that the occupant support further includes a seat frame having a backrest portion and a headrest portion coupled to the backrest portion.

The seat back 14 further includes a frame 34 as shown in FIG. 6. The frame 34 includes a seat back frame 36 and a headrest frame 38 coupled to the seat back frame 36. The seat back frame 36 underlies the backrest cushion 15 and the bolsters 17, 19. The headrest frame 38 underlies the headrest 18 and integrates the headrest 18 with the backrest 16. The restraint cushion 22 is configured to move relative to the frame 34 without moving the headrest restraint 20.

Another embodiment of an occupant support 210, in accordance with the present disclosure, is shown in FIGS. 7-10. The occupant support 210 includes a seat bottom 212 and a seat back 214. The seat back 214 includes a backrest 216 and a headrest 218.

The headrest 218 includes an integrated headrest restraint 220, a restraint cushion 222, and an actuator system 224 as shown in FIG. 7. The headrest restraint 220 is coupled to the backrest 216 and supports the restraint cushion 222 and the actuator system 224. The restraint cushion 222 is movable relative to the headrest restraint 220 upon actuation of the pneumatics system 224. The actuator system 224 includes pneumatic or mechanical actuators and is configured to move the restraint cushion 222 relative to the headrest restraint 220.

The restraint cushion 222 includes an upper region 226 and a lower region 228 as shown in FIG. 7. The upper region 226 is positioned adjacent to the headrest restraint 220 and above the backrest 216. The lower region 228 is positioned below the upper region 226 and adjacent to the backrest 216 within the cushion receiving space 221 formed in the backrest 216. In one example, the restraint cushion may further include a cover that is movable with the restraint cushion 222 and blocks movement of the restraint cushion 222 away from the headrest restraint 220.

The upper region 226 and the lower region 228 are movable relative to the headrest restraint 220 from an expanded state to a retracted state as shown in FIGS. 7-10. The upper region 226 and the lower region 228 extend away from the seat back 214 in the expanded state and extend toward the seat back 214 in the retracted state. The upper region 226 and the lower region 228 are movable independently of one another as suggested in FIGS. 8 and 9.

The actuator system 224 includes a plurality of pneumatic bladders 230 and a pump system 232 as shown in FIG. 10. The plurality of pneumatic bladders is arranged to lie between the headrest restraint 220 and the restraint cushion 222 to move the upper and lower regions 226, 228 between the expanded state and the retracted state. The pump system 232 includes at least one pump 234 for inflating the bladders based on user inputs 235 and a manifold 236 for controlling the inflation and deflation of the plurality of bladders 230 in response to the user inputs 235.

The plurality of bladders 230 includes a first bladder 238 and a second bladder 240 as shown in FIG. 10. The first bladder 238 is arranged to lie adjacent to the upper region 226 of the restraint cushion 222. The second bladder 240 is arranged to lie adjacent to the lower region 228 of the restraint cushion 222. The first and second bladders 238, 240 move the upper and lower regions 226, 228 between the expanded state and the retracted state to provide the space 221 in either the upper region 226 or the lower region 228. When the first and second bladders 238, 240 are inflated, the restraint cushion 222 is arranged in the expanded state and the space 221 is closed.

The upper and lower regions 226, 228 may be moved to any and all positions between the expanded state and the retracted state to fit occupants of different sizes and maximize comfort for the occupant. Although the plurality of bladders 230 includes first and second bladders 238, 240, any suitable number of bladders may be used in the headrest 218. For example, the headrest 218 may be modified to include a third bladder positioned between the first and second bladders 238, 240 adjacent to a middle region of the restraint cushion 222. The third bladder may increase a range of motion of the restraint cushion relative to the headrest restraint and thereby increase adaptability of the headrest 18 to a given occupant. In another embodiment, the actuator system 224 includes mechanical actuators.

Another embodiment of an occupant support 310, in accordance with the present disclosure, is shown in FIGS. 11 and 12. The occupant support 310 includes a seat bottom 312 and a seat back 314. The seat back 314 includes a backrest 316 and a headrest 318.

The headrest 318 includes am integrated headrest restraint 320, a restraint cushion 322, and a flexible cover 324. The headrest restraint 320 is coupled to the backrest 16 and supports the restraint cushion 322 and the cover 324. The restraint cushion 322 is movable relative to the headrest restraint 320 and the cover 324. The cover 324 covers the restraint cushion 322 and blocks movement of the restraint cushion 322 away from the predetermined path.

The restraint cushion 322 is configured to move upwardly and downwardly along the seat back 314 from the fully raised position as shown in FIG. 11 to the fully lowered position as shown in FIG. 12. The restraint cushion 322 is located between the headrest restraint 320 and the cover 324. In one example, the restraint cushion 322 is made of foam materials such as, for example, polyethylene. In another example, the restraint cushion 322 includes a pneumatic bladder that is inflatable such that the restraint cushion 322 extends outward away from the seat back 314.

The cover 324 is coupled to the seat back 14 on top of the restraint cushion 322 to block movement of the restraint cushion away from the seat back 314. In the illustrative embodiment, the cover 324 is formed from a thin sheet of polypropylene. However, the cover 324 may be formed of any suitable material. The cover is flexible to allow the restraint cushion 322 to translate up and down along the seat back 314 from the fully raised position to the fully lowered position.

Another embodiment of an occupant support 410, in accordance with the present disclosure, is shown in FIGS. 13 and 14. The occupant support 410 includes a seat bottom 412 and a seat back 414. The seat back 414 includes a backrest 416 and a headrest 418.

The headrest 418 includes an integrated headrest restraint 420, a restraint cushion 422, and a mount system 424. The headrest restraint 420 is integrally formed with the backrest 416. The restraint cushion 422 is coupled to the headrest restraint 420 for movement relative to the headrest restraint 420 along a predetermined path to maintain a head of the occupant within a predetermined distance from the headrest 418.

The restraint cushion 422 further includes a restraint-cushion pad 430 and a flexible restraint-cushion plate 432 as shown in FIG. 14. The restraint-cushion pad 430 is arranged to face toward an occupant to support the head of the occupant. The restraint-cushion plate 432 is arranged to lie between the restraint-cushion pad 430 and the headrest restraint 420 and is movable with the restraint-cushion pad 430 between the fully lowered position and the fully raised position.

The restraint-cushion plate 432 is deformable to assume and maintain one of a plurality of shapes to form a better fit for occupants of varying sizes and occupants that have varying comfort preferences. In one example, the restraint-cushion plate 432 is configured to change between a generally flat shape as shown in FIG. 13 and a curved shape as shown in FIG. 14. In the curved shape, the restraint-cushion plate 432 forms a generally convex curve relative to the occupant to extend at least a portion of the restraint cushion 422 away from the headrest restraint 420. The occupant may change the restraint-cushion plate 432 from the generally flat shape to a curved shape by compressing upper and lower ends of the restraint cushion 422 so that the restraint-cushion pad extends toward the occupant.

Another embodiment of an occupant support 510, in accordance with the present disclosure, is shown in FIGS. 15A and 15B. The occupant support 510 includes a seat bottom 512 and a seat back 514. The seat back 514 includes a backrest 516 and a headrest 518.

The headrest 518 includes an integrated headrest restraint 520, a restraint cushion 522, and a mount system 524. The headrest restraint 520 is integrally formed with the backrest 516. The restraint cushion 522 is coupled to the headrest restraint 520 for movement relative to the headrest restraint 520 along a predetermined path to maintain a head of the occupant within a predetermined distance from the headrest 518.

The mount system 524 provides adjustment means for the headrest 518 and includes a track 526 and a coupler guide 528. The track 526 is coupled to the seat back 514 and is shaped to define the predetermined path. The coupler guide 528 is coupled to the restraint cushion 522 and the track 526. In one example, the coupler guide 528 cooperates with the track 526 to block movement of the restraint cushion 522 away from the predetermined path.

The track 526 is formed to include a t-shaped channel 530 formed in the headrest restraint 520 as shown in FIG. 15A. The track 526 further includes a strap 532 that is configured to couple to the headrest restraint 520 and cover the channel 530. The strap 532 includes a first end 534 coupled permanently to an upper end of the headrest restraint 520 and a second end 536 coupled selectively to the headrest restraint 520 near the upper edge 515U of the backrest cushion 515 within the space 521.

The second end 536 of the strap 532 includes attachment means 538 to couple selectively the strap 532 to the headrest restraint 520 as shown in FIG. 15B. In one example, the attachment means 538 includes hook-and-loop structures. The occupant may uncouple the second end 536 of the strap 532 to remove and replace the restraint cushion 522 with another restraint cushion having a different size and shape. As such, the headrest 18 forms a better fit for occupants of varying sizes and occupants having varying comfort preferences. In other examples, the attachment means 538 may include adhesives, magnets, buttons, snaps, or any other suitable attachment means.

The coupler guide 528 engages the headrest restraint 520 to allow up-and-down movement of the restraint cushion 522 along the predetermined path. The coupler guide 528 includes sleeve 540 and a t-shaped tab 542 as shown in FIG. 15A. The sleeve 540 is coupled to the restraint cushion 522 and provides a strap space 541 that is shaped to receive the strap 532 therein. The tab 542 is coupled to the sleeve 540 and extends toward the headrest restraint 520. The t-shaped channel 530 receives the tab 542 to couple the restraint cushion 522 to the headrest restraint 520.

Another embodiment of an occupant support 610, in accordance with the present disclosure, is shown in FIG. 16. The occupant support 610 includes a seat bottom 612 and a seat back 614. The seat back 614 includes a backrest 616 and a headrest 618.

The headrest 618 includes an integrated headrest restraint 620, a restraint cushion 622, and a mount system 624. The headrest restraint 620 is coupled to the backrest 616. The restraint cushion 622 is coupled to the headrest restraint 620 by the mount system 624 and is configured to move relative to the headrest restraint 620 from a fully raised position to a fully lowered position.

The mount system 624 is coupled to an outer surface of the seat back 614 and includes a first track 626 and a second track 628 as shown in FIG. 16. The first and second tracks 626, 628 extend from an upper end of the headrest restraint 620 to a point on the backrest 616. The tracks 626, 628 define a predetermined path on which the restraint cushion 622 travels to allow an occupant to adjust the restraint cushion 622 to any position on the predetermined path between the fully raised position and the fully lowered position.

In the illustrative embodiment, the tracks 626, 628 are straps and couple the restraint cushion 622 to the seat back 614. The restraint cushion 622 includes a restraint-cushion pad 630 and a restraint-cushion plate 632. The restraint-cushion pad 630 is arranged to cushion the head of an occupant and is coupled to the restraint-cushion plate 632. The restraint-cushion plate 632 is formed to include strap spaces that receive the tracks 626, 628 to couple the restraint cushion 622 to the seat back 614. However, the tracks 626, 628 may include any suitable means of coupling the restraint cushion 622 to the seat back 614.

Another embodiment of an occupant support 710, in accordance with the present disclosure, is shown in FIG. 17. The occupant support 710 includes a seat bottom 712 and a seat back 714. The seat back 714 includes a backrest 716 and a headrest 718.

The headrest 718 includes an integrated headrest restraint 720, a restraint cushion 722, and a mount system 724. The headrest restraint 720 is integrally formed with the backrest 716. The restraint cushion 722 is coupled to the headrest restraint 720 for movement relative to the headrest restraint 720 along a predetermined path to maintain a head of the occupant within a predetermined distance from the headrest 718.

The restraint cushion 722 includes a cushion body 726, a first side wing 728, and a second side wing 730 as shown in FIG. 17. The cushion body 726 is coupled to the seat back 714 by the mount system 724 and is configured to move upward and downward relative to the headrest restraint 720. The first and second side wings 728, 730 are coupled to opposite, respective edges of the cushion body 726. The first and second side wings 728, 730 are pivotable about respective side-wing axes 732, 734. The first and second side wings pivot inwardly to provide lateral support surfaces for the occupant.

Another embodiment of an occupant support 810, in accordance with the present disclosure, is shown in FIG. 18. The occupant support 810 includes a seat bottom 812 and a seat back 814. The seat back 814 includes a backrest 816 and a headrest 818.

The headrest 818 includes an integrated headrest restraint 820, a restraint cushion 822, and a mount system 824. The headrest restraint 820 is integrally formed with the backrest 816. The restraint cushion 822 is coupled to the headrest restraint 820 for movement relative to the headrest restraint 820 along a predetermined path to maintain a head of the occupant within a predetermined distance from the headrest 818.

The restraint cushion 822 includes a head cushion 826 and a neck cushion 828 as shown in FIG. 18. The head cushion 826 is arranged to lie above the neck cushion 828. The neck cushion 828 is coupled to the head cushion 826 and extends outward from the headrest 818. In one example, the neck cushion 828 includes a pneumatic air bladder that may be inflated and deflated to extend and retract from the headrest 818. As such, the neck cushion 828 is configured to fit occupants of varying sizes or occupants with different comfort preferences.

Other embodiments of occupant supports, in accordance with the present disclosure, may include other features and designs. Another embodiment of an occupant support 910, in accordance with the present disclosure, is shown in FIG. 19. The occupant support 910 includes the seat bottom 912 and a seat back 914. The seat back 914 includes a backrest 916 and a headrest 918.

The headrest 918 includes an integrated headrest restraint 920, a restraint cushion 922, and a mount system 924. The headrest restraint 920 is integrally formed with the backrest 916. The restraint cushion 922 is coupled to the headrest restraint 920 for movement relative to the headrest restraint 920 along a predetermined path to maintain a head of the occupant within a predetermined distance from the headrest 918.

The headrest 918 further includes a pneumatic system 926 as shown in FIG. 19. The pneumatics system 926 includes at least one pneumatic bladder 928 and a pump system 930. The at least one pneumatic bladder 928 may be inflated and deflated to extend and retract from the headrest 918. As such, the at least one pneumatic bladder 928 is configured to fit occupants of varying sizes or occupants with different comfort preferences.

The pneumatics system 926 is configured to interact with other pneumatics systems included within the occupant support 910. In one example, the occupant support 910 includes a pneumatic seat back 914 having at least one pneumatic bladder 915 coupled in fluid communication to the pneumatic system 926 of the headrest 918. The pump system 930 includes a pump 932 configured to inflate the bladders in the seat back 914 and the headrest 918 and a manifold 934 configured to regulate the inflation and deflation of the bladders. The bladders in the seat back 914 and the headrest 918 may be inflated and deflated independently or simultaneously by the pump 932 and the manifold 934.

Another embodiment of an occupant support 1010, in accordance with the present disclosure, is shown in FIG. 20. The occupant support 1010 includes a seat bottom 1012 and a seat back 1014. The seat back 1014 includes a backrest 1016 and a headrest 1018.

The headrest 1018 includes an integrated headrest restraint 1020, a restraint cushion 1022, and a mount system 1024. The headrest restraint 1020 is integrally formed with the backrest 1016. The restraint cushion 1022 is coupled to the headrest restraint 1020 for movement relative to the headrest restraint 1020 along a predetermined path to maintain a head of the occupant within a predetermined distance from the headrest 1018.

The mount system 1024 includes a track 1026 and a coupler guide 1028 as shown in FIG. 20. The track 1026 is coupled to the seat back 1014 and is shaped to define the predetermined path. The coupler guide 1028 is coupled to the restraint cushion 1022 and the track 1026. In one example, the coupler guide 1028 cooperates with the track 1026 to block movement of the restraint cushion 1022 away from the predetermined path.

The track 1026 is formed to include a channel 1030 that defines the predetermined path as shown in FIG. 20. The headrest 1018 further includes a hook 1032 arranged to lie within the channel 1030. The hook 1032 is configured to change between a compact-storage position and an expanded—use position. The hook is pivoted upwardly into the compact-storage position to allow the restraint cushion 1022 to move upwardly and downwardly from the fully lowered position to the fully raised position. When the headrest is moved to the fully raised position, the hook 1032 is exposed and may be pivoted downwardly to the expanded-use position. A user may hang an object from the hook when the seat is not occupied by an occupant.

In another embodiment, the headrest 1018 further includes a backlight 1034 arranged to lie in the channel 1030. The backlight 1034 is configured to illuminate the headrest 1018 and any features thereon so that a user may operate the headrest 1018 and the features included in the headrest 1018.

It should be appreciated that while disclosure is made to several embodiments herein, each embodiment is intended to be non-limiting and may be combined with one or more other embodiments described herein. As such, one or more of the features, elements, or components described herein for one embodiment may be included in another embodiment described herein.

In illustrative embodiments, a personal fit headrest in accordance with the present disclosure comprises a separate head-restraint portion (also called headrest restraint 20) from the head-support portion (also called restraint cushion 22). Safety standard FMVSS 206 generally requires the skull of an occupant to be positioned within 25 mm of the headrest restraint surface. This space may not accommodate the full range of soft tissue, hair, and posture of many occupants. The separation of the head-support portion and the head-restraint portion maintains the relationship of the skull to head-restraint or head support portion for a manikin, but allows a variety of occupants to find a comfortable head-support position while maintaining the head-restraint position, achieving greater comfort and safety simultaneously.

In illustrative embodiments, the upper seat back is relieved down to a back exit line 15U (also called upper edge 15U). The head rest comfort padding volume may slide or adjust from the top of the headrest restraint through the seat back relief. A variety of methods may be used to shift the volume of the headrest padding vertically, from the top of the headrest restraint to the back exit line. The result is that consumers may shift the headrest padding through a larger range of adjustment while maintaining the head-restraint safety feature.

In illustrative embodiments, shorter passengers may move the head-support portion much lower for an improved fit and increased comfort. Occupants with long hair may shift the head-support portion up to make room for a ponytail, or down to make room for a bun hairstyle. Taller occupants may choose to shift the padding to their neck or upper shoulders to arch their back. All passengers will find their head shifting down in relationship to the seat when they recline, and this disclosure shows that the personal fit headrest helps them adjust for a comfortable, reclined posture.

In illustrative embodiments, the option of shifting the head-support portion down and out of the way may simply minimize chances of an occupant from sitting away from a headrest, reclining the seat more, using pillows or aftermarket pads to push them forward, or attempting to improperly remove or modify the headrest to become unsafe. The effect of the disclosure is to encourage the occupant to sit into the seat back in a comfortable and safe manner, and to be protected by the headrest restraint, regardless of how they position the headrest.

In illustrative embodiments, occupants may complain about headrest comfort due to intrusiveness of a head-support portion. Occupants often look for ways to remove or modify the intrusive portion.

In illustrative embodiments, the FMVSS safety standard recommends a distance of 20 mm from a headrest to a head form. For shorter occupants and some hairstyles, achieving comfort means sitting further away from the headrest restraint. For example, occupants with a bun hairstyle can sit three times the recommended distance away from the headrest. This may also result in uncomfortable contact of the occupant's hair with the headrest. Forced to sit forward and away from the headrest, the occupant also creates poor posture for comfort to add strain to the neck and shoulders.

In illustrative embodiments, short, average, and tall occupants with a ponytail hairstyle can sit twice the safe distance from the headrest, with uncomfortable contact of hair to a headrest. These occupants may sit too far from the headrest, causing risk of injury in the event of an impact event.

In illustrative embodiments, the personal fit headrest maintains current crash safety standards while improving real-world safety and comfort experienced by the occupant. More adjustment allows a greater number of occupants to find a comfortable and safe posture, closer to the headrest. A personal fit headrest provides adjustable rest padding (also called head-support) and an integrated, static headrest restraint (also called a head-restraint portion).

In illustrative embodiments, a personal fit headrest combines extended adjustment range with a recess that allows a number of physically-diverse occupants to adjust the headrest to an improved position. This distinctly separates the head-support portion from the head-restraint portion, allowing the head-support portion to adjust without moving the headrest restraint portion.

In illustrative embodiments, a personal fit headrest creates a recess from the back exit line to the peak of the head-restraint portion, which allows the head-support portion to travel, and creates a usable void or relief. The head-restraint portion is integrated with the backrest in some embodiments, which allows the head-support portion to have a greater range of adjustment.

In illustrative embodiments, a personal fit headrest may be separately attached or integrated into the personal fit headrest structure. Other personal fit headrests may be implemented in a number of different ways, including but not limited to providing a hard trim piece, such as a thin strip attached to the seat structure or incorporating a decorative, hard-trim back panel.

In illustrative embodiments, methods for trimming and implementing the personal fit headrest include, but are not limited to, using a slip cover with an integrated soft zipper, flexible slide-extrusions, straps or chords, and grooves created by cover carving and trim methods. A slip cover with added visible close-outs provides an opportunity for added features or accessories.

In illustrative embodiments, integrated or add-on sleep supports to fit a number of differently-sized occupants may be added. For example, children may sleep during long road trips may benefit from such supports. An ancillary benefit of separating the head rest padding from the headrest restraint portion of the headrest is using comparably softer durometer or memory foam for improved comfort of the occupant. A slip cover may be used with flexible sidewalls or individually-trimmed inserts. An option with shape-changing surfaces may also be used. This may work analogous to a lumbar support or pneumatic upper back adjustment, and would not require adjustment of the headrest position at all.

In illustrative embodiments, a hidden track with strap may be used to connect the head rest portion to the vehicle seat to form a personal fit headrest. There may be a single track or dual tracks for a personal fit headrest. A personal fit headrest may add potential for a broader number of features. These features include but are not limited to all types of height adjustment, pneumatic filling or deflating of components, rotating, shape-changing, surface ventilation, self-fitting, and integration with an upper back adjustment. A central recessed spaced may serve to include on or more features otherwise not included in a headrest. The strap attachment portion may comprise any type of material that can form a suitable attachment, including but not limited to adhesive, hook-and-loop fasteners, buttons, chains, straps, chords, and other attachment mechanisms. One portion of strap attachment portion is on the distal, free end of the strap at while the second attachment portion is integrated into the vehicle seat for seamless assembly when both portions of are connected.

In illustrative embodiments, a personal fit headrest could be the foundation for an integrated neck pillow. Integrating neck pillows may create additional support around vulnerable areas of the body of the occupant. Methods for integration of a neck pillow include, but are not limited to, a shortened rest-to-curve shape to flatten in the event of an impact event, expanding or contracting a pneumatic pillow with a blow-out valve for safety in the event of an impact event, and a pneumatic bladder or foam cam at the occupant side, lower portion of the head rest portion.

In illustrative embodiments, applications of the personal fit headrest includes, but are not limited to, vehicle seats that can be retrofitted with a personal fit headrest, performance vehicle seats, vehicle luxury seats, original equipment manufacturer (OEM) seats that include accessories, seats that will include a power headrest, reclining second row seats, a NATURAL MOTION™ headrest, autonomous cruise control vehicle seats, and other uniquely-designed vehicle seats.

In illustrative embodiments, the headrest includes a head-restraint portion and a head-support portion. The head-restraint portion is separated from the head-support portion to allow the occupant to have a greater range of adjustment for the head-support portion while maintaining headrest restraint requirements for occupants. An example of head-rest restraint requirements include but are not limited to FMVSS 206, which is incorporated by reference herein in its entirety.

The following numbered clauses include embodiments that are contemplated and non-limiting:

Clause 1. An occupant support comprising a seat bottom arranged to overlie a floor.

Clause 2. The occupant support of clause 1, any other clause, or combination of clauses, further comprising a seat back arranged to extend upwardly away from the seat bottom.

Clause 3. The occupant support of clause 2, any other clause, or combination of clauses, wherein the seat back includes a backrest arranged to support an occupant in an upright position and a headrest.

Clause 4. The occupant support of clause 3, any other clause, or combination of clauses, wherein the headrest is integrally formed with the backrest.

Clause 5. The occupant support of clause 4, any other clause, or combination of clauses, wherein the headrest includes a headrest restraint and a restraint cushion.

Clause 6. The occupant support of clause 5, any other clause, or combination of clauses, further comprising adjustment means for locating the restraint cushion in one of a plurality of positions defined along a predetermined path relative to the headrest restraint to cause the restraint cushion and the headrest restraint to provide a hair-receiving space between the headrest restraint and the occupant for receiving a bunching of hair without moving the headrest restraint so that a distance between the headrest and a head of the occupant is no greater than a predetermined distance.

Clause 8. The occupant support of clause 5, any other clause, or combination of clauses, wherein the predetermined path is curvilinear.

Clause 9. The occupant support of clause 5, any other clause, or combination of clauses, wherein the adjustment means includes a track and a coupler guide.

Clause 10. The occupant support of clause 9, any other clause, or combination of clauses, wherein the track is coupled to the seat back and shaped to define the predetermined path Clause 11. The occupant support of clause 10, any other clause, or combination of clauses, wherein the coupler guide is coupled to the restraint cushion and coupled to the track to block movement of the restraint cushion away from the predetermined path.

Clause 12. The occupant support of clause 5, any other clause, or combination of clauses, wherein the track is formed to define a channel and the coupler guide includes a tab that extends into the channel formed in the track.

Clause 13. The occupant support of clause 12, any other clause, or combination of clauses, wherein the coupler guide includes a sleeve and the track includes a strap that extends through the sleeve.

Clause 14. The occupant support of clause 12, any other clause, or combination of clauses, wherein the adjustment means further includes a strap coupled to the restraint cushion and to the seatback.

Clause 15. The occupant support of clause 11, any other clause, or combination of clauses, wherein the restraint cushion is movable along the predetermined path between a fully raised position and a fully lowered position.

Clause 16. The occupant support of clause 15, any other clause, or combination of clauses, wherein the restraint cushion is arranged to lie between the occupant and the headrest restraint in the fully raised position and the restraint cushion is arranged to lie between the occupant and the backrest in the fully lowered position.

Clause 17. The occupant support of clause 16, any other clause, or combination of clauses, wherein the backrest includes a lower end and an upper end spaced apart from the lower end, the lower end is coupled to the seat bottom, the backrest is formed to define a cushion-receiving space at the upper end of the backrest, the cushion-receiving space extends into the backrest and opens toward the headrest restraint, and the restraint cushion is received in the cushion-receiving space when the restraint cushion is in the fully lowered position.

Clause 18. The occupant support of clause 5, any other clause, or combination of clauses, wherein the means includes a cover arranged around the headrest restraint and the restraint cushion to locate the restraint cushion between the cover and the headrest restraint.

Clause 19. The occupant support of clause 18, any other clause, or combination of clauses, wherein the restraint cushion is configured to slide up and down relative to the headrest restraint and the cover is configured to block movement of the restraint cushion away from the predetermined path.

Clause 20. An occupant support comprising a seat bottom arranged to overlie a floor of a vehicle and to support an occupant of the occupant support thereon.

Clause 21. The occupant support of clause 20, any other clause, or combination of clauses, further comprising a seat back arranged to extend upwardly away from the seat bottom, the seat back including a backrest arranged to support the occupant in an upright position and an integrated headrest formed by an upper portion of the seat back.

Clause 22. The occupant support of clause 21, any other clause, or combination of clauses, wherein the headrest includes a headrest restraint and a restraint cushion.

Clause 23. The occupant support of claim 22, any other clause, or combination of clauses, wherein the headrest restraint is fixed to the backrest for movement with the backrest.

Clause 24. The occupant support of claim 23, any other clause, or combination of clauses, wherein the restraint cushion is coupled to the headrest restraint for movement with the headrest restraint and for movement relative to the headrest restraint along a predetermined path.

Clause 25. The occupant support of clause 23, any other clause, or combination of clauses, wherein the headrest further includes a frame located within the headrest restraint, a track coupled to the seat back and shaped to define the predetermined path, and a coupler guide coupled to the restraint cushion and to the track.

Clause 26. The occupant support of clause 25, any other clause, or combination of clauses, wherein the track is coupled to the headrest restraint and to the seat back.

Clause 27. The occupant support of clause 26, any other clause, or combination of clauses, wherein the restraint cushion is movable along the predetermined path between a fully raised position and fully lowered position, the restraint cushion is located near a top of the headrest restraint when the restraint cushion is in the fully raised position, and the restraint cushion overlies the backrest when the restraint cushion is in the fully lowered position.

Clause 28. The occupant support of clause 27, any other clause, or combination of clauses, wherein the backrest is formed to include a cushion-receiving space that opens toward the headrest restraint and the restraint cushion is arranged to lie within the cushion-receiving space when the restraint cushion is in the fully lowered position.

Clause 29. The occupant support of clause 25, any other clause, or combination of clauses, wherein the track is formed to define a channel and includes a zipper configured to close the channel and the zipper is coupled to the restraint cushion to open and close the channel as the restraint cushion moves along the predetermined path.

Clause 30. The occupant support of clause 25, any other clause, or combination of clauses, wherein the track is formed to define a channel and the coupler guide includes a tab that extends into the track and the headrest further includes a strap coupled to the restraint cushion and to the headrest restraint.

Clause 31. The occupant support of clause 22, any other clause, or combination of clauses, wherein the predetermined path is curvilinear.

Clause 32. The occupant support of clause 22, any other clause, or combination of clauses, wherein the restraint cushion includes a restraint-cushion pad and a restraint-cushion plate arranged to lie between the restraint-cushion pad and the headrest restraint and the restraint-cushion plate is deformable to assume and maintain one of a plurality of shapes.

Clause 33. The occupant support of clause 32, any other clause, or combination of clauses, wherein the restraint-cushion plate is configured to change between a generally flat shape and a curved shape in which the restraint-cushion plate forms a generally convex curve to extend the restraint cushion away from the headrest restraint.

Clause 34. The occupant support of clause 22, any other clause, or combination of clauses, wherein the headrest further includes a cover arranged around the restraint cushion to locate the restraint cushion between the cover and the headrest restraint and the cover is flexible to allow the restraint cushion to translate up-and-down relative to the headrest restraint.

Clause 35. The occupant support of clause 22, any other clause, or combination of clauses, wherein the restraint cushion includes at least one pneumatic bladder.

Clause 36. The occupant support of clause 22, any other clause, or combination of clauses, wherein the restraint cushion includes a first pneumatic bladder and a second pneumatic bladder spaced apart from the first pneumatic bladder to locate the first pneumatic bladder between the seat bottom and the second pneumatic bladder.

Clause 37. The occupant support of clause 22, any other clause, or combination of clauses, wherein the restraint cushion includes a body, a right-side wing coupled to the body, and a left-side wing spaced apart from the right-side wing and coupled to the body and the left-side wing and the right-side wing are coupled to the body for pivotable movement relative to the body.

Clause 38. The occupant support of clause 22, any other clause, or combination of clauses, wherein the seat back is formed to define a channel that extends into the headrest restraint and the seat back, the channel defines the predetermined path, and the occupant support further includes a utility hook coupled to the seat back and located in the channel.

Clause 39. The occupant support of clause 38, any other clause, or combination of clauses, wherein the utility hook is mounted to one of the backrest and the headrest restraint for pivotable movement relative to the seat back between an expanded-use position in which the utility hook extends out of the channel and away from the seat back and a storage position in which the utility hook is located fully in the channel.

Clause 40. The occupant support of clause 38, any other clause, or combination of clauses, wherein the occupant support further includes a backlight located in the channel.

The invention claimed is:

1. An occupant support comprising
a seat bottom arranged to overlie a floor,
a seat back arranged to extend upwardly away from the seat bottom, the seat back including a backrest arranged to support an occupant in an upright position and a headrest including a headrest restraint and a restraint cushion, the headrest restraint being integrally formed with the backrest, the backrest including a lower end and an upper end spaced apart from the lower end, and
adjustment means for locating the restraint cushion in one of a plurality of positions defined along a predetermined path relative to the headrest restraint to cause the restraint cushion and the headrest restraint to provide a hair-receiving space between the headrest restraint and the occupant for receiving a bunching of hair without moving the headrest restraint so that a distance between the headrest and a head of the occupant is no greater than a predetermined distance,
wherein the predetermined path is curvilinear, a midpoint of the predetermined path located between a topmost point of the predetermined path and a bottommost point of the predetermined path along the predetermined path is located further rearwardly relative to the backrest than the topmost point and the bottommost point, the lower end is coupled to the seat bottom and defines a backrest surface, the backrest is formed to include a recess at the upper end of the backrest, the recess includes a recess surface that extends along a direction of the predetermined path, the recess surface is rearwardly spaced apart from the backrest surface, and the restraint cushion is received in the recess when the restraint cushion is in the fully lowered position.

2. The occupant support of claim 1, wherein the adjustment means includes a track and a coupler guide, the track is coupled to the seat back and shaped to define the predetermined path, and the coupler guide is coupled to the restraint cushion and coupled to the track to block movement of the restraint cushion away from the predetermined path.

3. The occupant support of claim 2, wherein the track is formed to define a channel and the coupler guide includes a tab that extends into the channel formed in the track.

4. The occupant support of claim 2, wherein the adjustment means further includes a strap coupled to the restraint cushion and to the seat back.

5. The occupant support of claim 2, wherein the restraint cushion is movable along the predetermined path between a fully raised position and a fully lowered position, the restraint cushion is arranged to lie between the occupant and the headrest restraint in the fully raised position, and the restraint cushion is arranged to lie between the occupant and the backrest in the fully lowered position.

6. The occupant support of claim 1, wherein the adjustment means includes a cover arranged around the headrest restraint and the restraint cushion to locate the restraint cushion between the cover and the headrest restraint, the restraint cushion is configured to slide up and down relative to the headrest restraint, and the cover is configured to block movement of the restraint cushion away from the predetermined path.

7. An occupant support comprising
a seat bottom arranged to overlie a floor,
a seat back arranged to extend upwardly away from the seat bottom, the seat back including a backrest arranged to support an occupant in an upright position and a headrest including a headrest restraint and a restraint cushion, the headrest restraint being integrally formed with the backrest, and
adjustment means for locating the restraint cushion in one of a plurality of positions defined along a predetermined path relative to the headrest restraint to cause the restraint cushion and the headrest restraint to provide a hair-receiving space between the headrest restraint and the occupant for receiving a bunching of hair without moving the headrest restraint so that a distance between the headrest and a head of the occupant is no greater than a predetermined distance,
wherein the adjustment means includes a track and a coupler guide, the track is coupled to the seat back and shaped to define the predetermined path, and the coupler guide is coupled to the restraint cushion and coupled to the track to block movement of the restraint cushion away from the predetermined path, the track is formed to define a channel and the coupler guide includes a tab that extends into the channel formed in the track, the coupler guide includes a sleeve including a strap space that extends along a direction of the predetermined path, and the track includes a strap that extends along the direction of the predetermined path and extends through the strap space of the sleeve.

8. An occupant support comprising
a seat bottom arranged to overlie a floor of a vehicle and to support an occupant of the occupant support thereon, and
a seat back arranged to extend upwardly away from the seat bottom, the seat back including a backrest arranged to support the occupant in an upright position and a headrest, the backrest defining a first radius of curvature,
wherein the headrest includes (i) a headrest restraint integrated with the backrest and formed by an upper portion of the seat back, and (ii) a restraint cushion, the headrest restraint is fixed to the backrest for movement with the backrest, and the restraint cushion is coupled to the headrest restraint for movement with the headrest restraint and for movement relative to the headrest restraint along a predetermined path, the headrest further includes a frame located within the headrest restraint, a track coupled to the seat back and shaped to define the predetermined path, and a coupler guide coupled to the restraint cushion and to the track, the predetermined path is curvilinear and defines a second radius of curvature, a midpoint of the predetermined path located between a topmost point of the predetermined path and a bottommost point of the predetermined path along the predetermined path is located further rearwardly relative to the backrest than the topmost point and the bottommost point, and the first radius of curvature is different than the second radius of curvature.

9. The occupant support of claim 8, wherein the track is coupled to the headrest restraint and to the seat back, the restraint cushion is movable along the predetermined path between a fully raised position and fully lowered position, and the backrest is formed to include a cushion-receiving space that opens toward the headrest restraint and the restraint cushion is arranged to lie within the cushion-receiving space when the restraint cushion is in the fully lowered position.

10. The occupant support of claim 8, wherein the track is formed to define a channel and the coupler guide includes a tab that extends into the track and the headrest further includes a strap coupled to the restraint cushion and to the headrest restraint.

11. The occupant support of claim 8, wherein the headrest further includes a cover arranged around the restraint cushion to locate the restraint cushion between the cover and the headrest restraint, the cover is flexible to allow the restraint cushion to translate up-and-down relative to the headrest restraint.

12. The occupant support of claim 8, wherein the restraint cushion includes a body, a right-side wing coupled to the body, and a left-side wing spaced apart from the right-side wing and coupled to the body and the left-side wing and the right-side wing are coupled to the body for pivotable movement relative to the body.

13. The occupant support of claim 7, wherein the restraint cushion includes a restraint-cushion pad and a restraint-cushion plate arranged to lie between the restrain-cushion pad and the headrest restraint and the restraint cushion plate is deformable to assume and maintain one of a plurality of shapes, the restraint-cushion plate is configured to change between a generally flat shape and a curved shape in which the restraint-cushion plate forms a generally convex curve to extend the restraint cushion away from the headrest restraint.

14. The occupant support of claim 8, wherein the seat back is formed to define a channel that extends into the headrest restraint and the seat back, the channel defines the predetermined path, and the occupant support further includes a hook coupled to the seat back and located in the channel, the hook is mounted to one of the backrest and the headrest restraint for pivotable movement relative to the seat back between an expanded-use position in which the hook extends out of the channel and away from the seat back and a storage position in which the hook is located fully in the channel.

15. The occupant support of claim 13, wherein the occupant support further includes a backlight located in the channel.

* * * * *